(12) United States Patent
Law et al.

(10) Patent No.: US 6,550,578 B1
(45) Date of Patent: Apr. 22, 2003

(54) VEHICULAR TIRE MOUNTABLE STEPSTOOL

(76) Inventors: Bruce Law, 312 W. Honda Bow Rd., Phoenix, AZ (US) 85027; John E. Toner, 5202 N. 106th Dr., Glendale, AZ (US) 85307

( * ) Notice: Subject to any disclaimer, the term of this patent is extended or adjusted under 35 U.S.C. 154(b) by 0 days.

(21) Appl. No.: 10/055,599

(22) Filed: Jan. 22, 2002

(51) Int. Cl.$^7$ ................................................. B60R 3/00
(52) U.S. Cl. ........................ 182/150; 182/92; 182/206
(58) Field of Search ................................ 182/150, 206, 182/90, 92; 280/165, 166, 163

(56) References Cited

U.S. PATENT DOCUMENTS

| | | | | |
|---|---|---|---|---|
| 2,851,312 A | * | 9/1958 | Hoff | 182/132 |
| 3,590,950 A | | 7/1971 | Wilson | 182/150 |
| 4,947,961 A | | 8/1990 | Dudley | 182/92 |
| 5,111,909 A | * | 5/1992 | Liu | 182/150 |
| 5,133,429 A | | 7/1992 | Densley | 182/50 |
| D376,784 S | | 12/1996 | Miller | D12/203 |
| 6,044,928 A | | 4/2000 | Law et al. | 182/150 |

* cited by examiner

Primary Examiner—Alvin Chin-Shue
(74) Attorney, Agent, or Firm—Jordan M. Meschkow; Lowell W. Gresham; Charlene R. Jacobsen

(57) ABSTRACT

A stepstool (20) configured for mounting on a tire (22) includes a support frame configured to rest against an outer surface (40) of the tire (22). An outside lower platform (34) and an outside upper platform (36) are attached to the support frame. A first retaining bar (114) is configured to rest against an inner surface (42) of the tire (22), and first linking members (104 and 106) link the first retaining bar (114) to the support frame. The stepstool (20) further includes an inside platform (38) configured to releasably couple to the first retaining bar (114) and reside proximate the inner surface (42) of the tire (22). A second retaining bar (132) is configured to rest against the outer surface (40) of the tire, and second linking members (128 and 130) link the second retaining bar (132) to the inside platform (38). The first and second linking members are directed over an upper circumferential surface (122) of the tire (22) to hold the stepstool (22) securely on the tire (22).

20 Claims, 4 Drawing Sheets

VEHICULAR TIRE MOUNTABLE STEPSTOOL

TECHNICAL FIELD OF THE INVENTION

The present invention relates generally to stepstools, and more particularly to stepstools for use in accessing the engine compartment of vehicles, such as medium- and heavy-duty commercial trucks, having tilt-forward hoods.

BACKGROUND OF THE INVENTION

Many medium- and heavy-duty commercial trucks have tilt-forward hoods. A tilt-forward hood is one which has its forward-most end pivotally connected with the front end section of the vehicle's main body for movement between a completely closed position and a fully opened position. The tilt-forward hood typically includes the front and side walls of the engine compartment, as well as the fenders, headlights, and reinforcing members, and thus involve substantial size. The tilt-forward hood enables access to the engine compartment of the vehicle for servicing the components found within the engine compartment.

When servicing of the vehicle is desired, the height and the width of the vehicle pose a problem for most individuals attempting to access the engine compartment from ground level. Accordingly, various platforms, such as ladders, stepstools, lift mechanisms, and such, are used to reach the engine compartment when the vehicle is in a repair shop. For example, a ladder or stepstool is typically positioned on the ground near the vehicle. The serviceperson can then stand on the ladder to reach the engine compartment. Unfortunately, platforms, such as ladders and stepstools, are often cumbersome to set up and properly position. In addition, such a platform may not be readily available if access to the engine compartment is desired when on the open road.

An even more serious problem with platforms placed on the ground is the inherent instability of such items. For example, if a ladder is placed on an unstable surface, such as sand or dirt, or on a surface that is not level, the movement of an individual on the ladder can cause it to tip over. A ladder crashing into the side of the vehicle can create scratches or dents in the body of the vehicle. However, a more critical consequence of a tipping ladder is that an individual standing on the ladder may be injured when the ladder falls.

In addition, although the individual is raised upward when using a ladder or stepstool positioned near the vehicle, the individual is then obliged to lean across the width of the tire, truck frame, and so forth to reach the engine compartment. Many injuries to the spine, legs, and arms are caused by the actions of bending and reaching across the width of a large vehicle.

SUMMARY OF THE INVENTION

Accordingly, it is an advantage of the present invention that a stepstool is provided for mounting on a tire of a vehicle having a tilt-forward hood.

It is another advantage of the present invention that a stepstool is provided having a stable configuration.

Another advantage of the present invention is that a portable stepstool is provided.

Yet another advantage of the present invention is the a stepstool is provided for readily accessing the engine compartment of a medium- or heavy-duty truck that minimizes the potential for injuries due to bending and reaching actions.

The above and other advantages of the present invention are carried out in one form by a vehicular stepstool for mounting on a tire of a vehicle having a tilt-forward hood. The stepstool includes a support frame having first and second upper ends and a first platform attached to the support frame. A first retaining bar has first and second bar ends. First linking members are attached to and extend from the first and second bar ends and are attached to the first and second upper ends of the support frame. A second platform is configured to releasably couple to the first retaining bar. A second retaining bar has third and fourth bar ends, and second linking members are attached to and extend from the third and fourth bar ends and are attached to the second platform.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
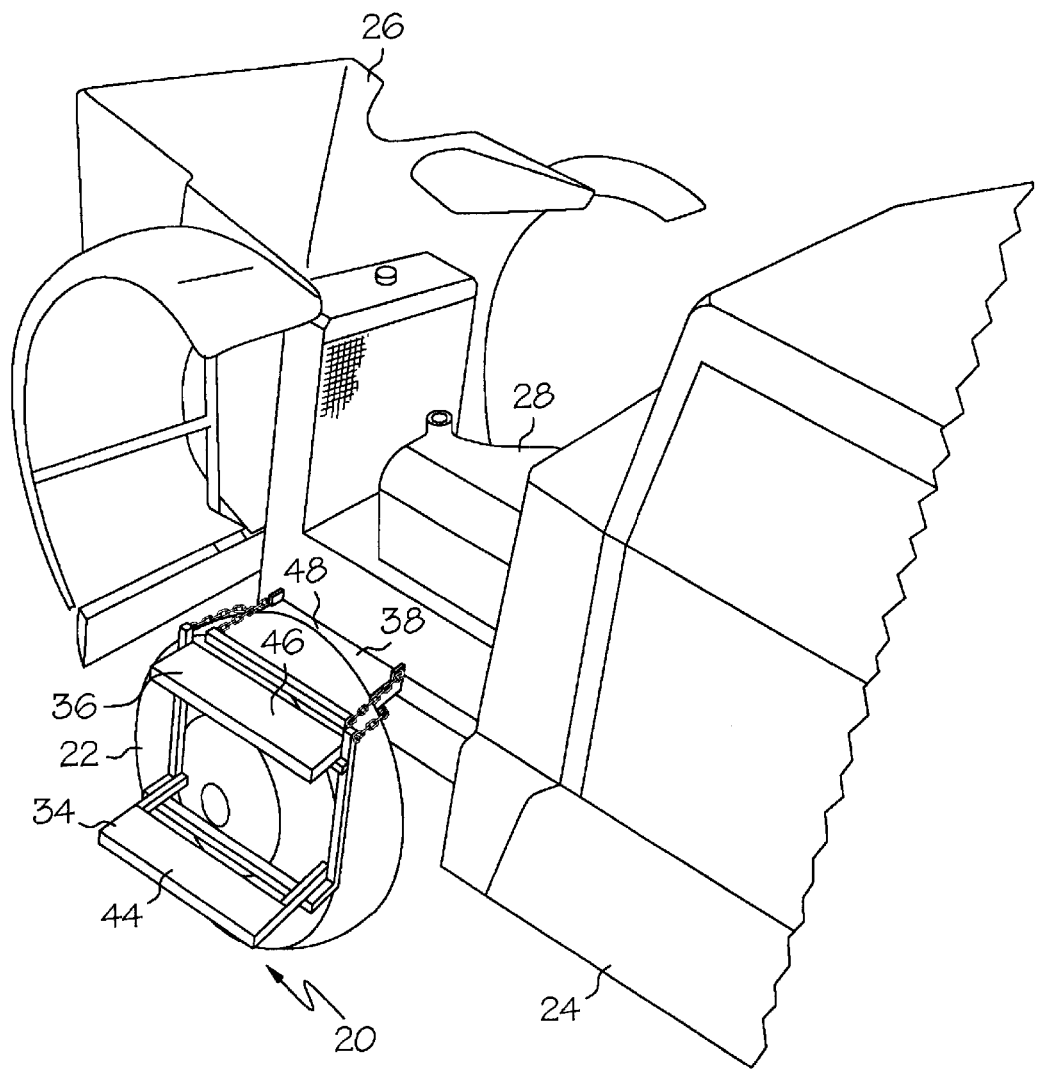
FIG. 1 shows a perspective view of a vehicular stepstool mounted on a tire of a vehicle having a tilt-forward hood in accordance with a preferred embodiment of the present invention.

FIG. 1 shows a perspective view of a vehicular stepstool 20 mounted on a tire 22 of a vehicle 24 having a tilt-forward hood 26 in accordance with a preferred embodiment of the present invention. Tilt-forward hood 26 has its forward-most end pivotally connected with the front end section of the main body of vehicle 24 for movement between a completely closed position and a fully opened position to enable access to an engine compartment 28 of vehicle 24. Vehicle 24 may be a medium-duty or heavy-duty commercial truck or tractor, or any other similar vehicle in which tire 22 can be exposed when vehicle 24 is not moving. Stepstool 20 may be found in a shop, truckstop, or other facility that services medium-duty and/or heavy-duty commercial trucks. Alternatively, vehicular stepstool 20 may be attached to or stored within vehicle 24 for use by the driver on the open road. Stepstool 20 is desirably formed from a high strength, material such as metal, wood, plastic, or some combination thereof.

Figure 2:
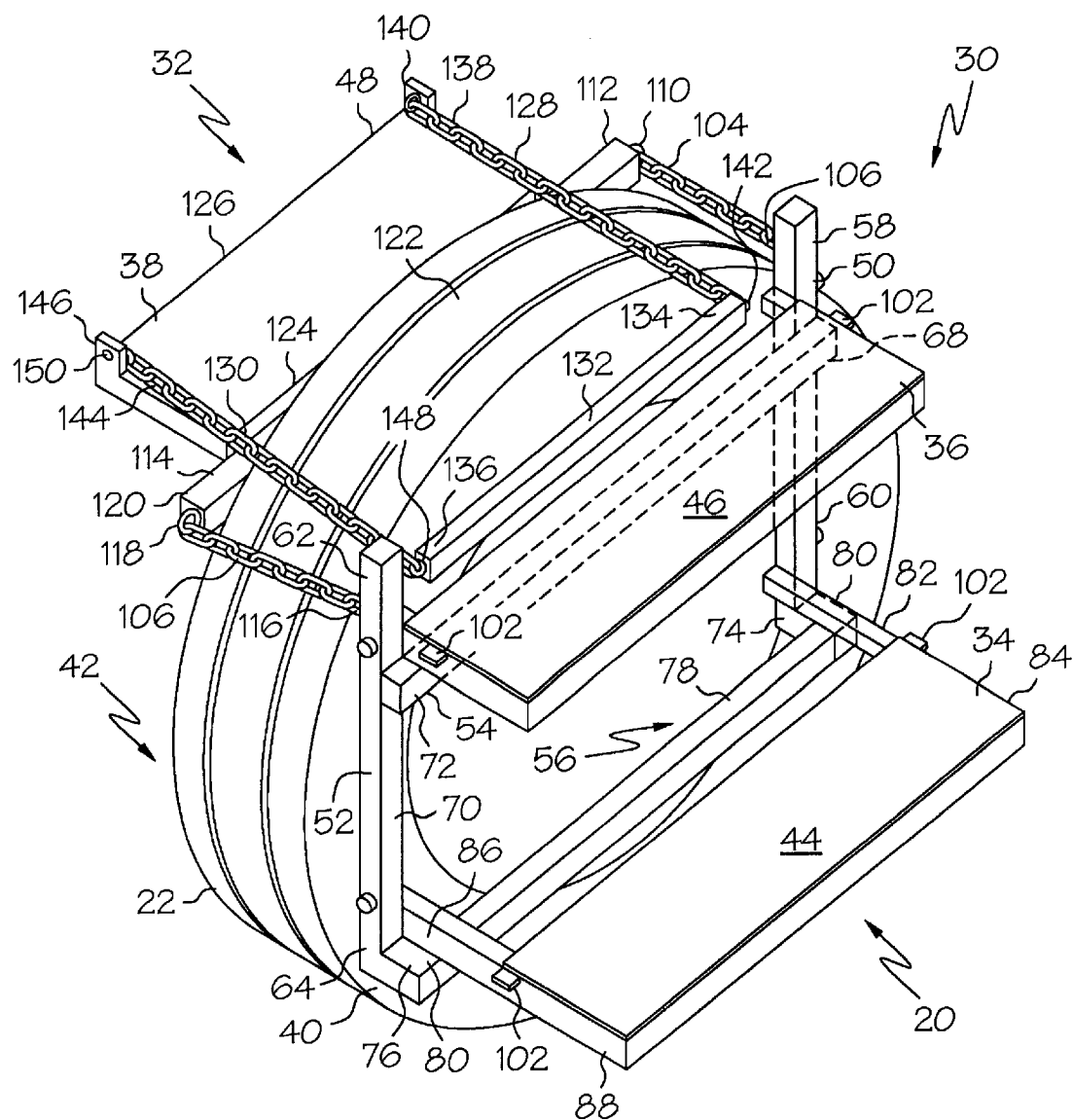
FIG. 2 shows an enlarged perspective view of the vehicular stepstool of FIG. 1 mounted on the tire.

Referring to FIG. 2 in connection with FIG. 1, FIG. 2 shows an enlarged perspective view of vehicular stepstool 20 mounted on tire 22. Stepstool 20 generally includes a first stepstool subassembly 30 and a second stepstool subassembly 32. First stepstool subassembly 30 includes an outside lower platform 34 and an outside upper platform 36, and second stepstool subassembly 32 includes an inside platform 38. Outside lower and upper platforms 34 and 36, respectively, are configured to reside proximate an outer surface 40 of tire 22, hence the nomenclature "outside" used herein. Inside platform 38 is configured to reside proximate an inner surface 42 of tire 22, hence the nomenclature "inside" used herein. When stepstool 20 is used in cooperation with tire 22, an individual may step up onto a lower platform surface 44 of outside lower platform 34, then onto an upper platform surface 46 of outside upper platform 36. The individual can then step over tire 22 and onto an inside platform surface 48 of inside platform 38 to readily reach into engine compartment 28 of vehicle 24.

First stepstool subassembly 30 of stepstool 20 includes a support frame having a first upright support 50, a second upright support 52, a third support 54, and a fourth support assembly 56. The components of the support frame of first stepstool subassembly 30 are coupled by conventional means, such as, bolts or welding, for strength and durability.

First upright support 50 has a first upper end 58 and a first lower end 60. Likewise, second upright support 52 has a second upper end 62 and a second lower end 64. First and second upright supports 50 and 52, respectively, have a tire contacting side 66 (see FIG. 3) configured to contact outer surface 40 of tire 22. Third support 54 has a first end 68 coupled to first upper end 58 of first upright support 50 on a side 70 (see FIG. 3) opposite tire contacting side 66, and a second end 72 coupled to second upper end 62 of second upright support 52 on side 70.

Fourth support assembly 56 includes a first extension post 74 coupled to and extending from side 70 of first upright support 50 at first lower end 60 and a second extension post 76 coupled to and extending from side 70 of second upright support 52 at second lower end 64. Fourth support assembly 56 further includes a fourth support 78 coupled to distal ends 80 of each of first and second extension posts 74 and 76, respectively.

Outside lower platform 34 includes a first post 82 extending from a first side 84 of lower platform surface 44 and a second post 86 extending from a second side 88 of lower platform surface 44. First post 82 is coupled to first lower end 60 of first upright support 50. Similarly, second post 86 is coupled to second lower end 64 of second upright support 52. In contrast, outside upper platform 36 is attached to first and second upright supports 50 and 52 proximate first and second upper ends 58 and 62, respectively.

Figure 3:
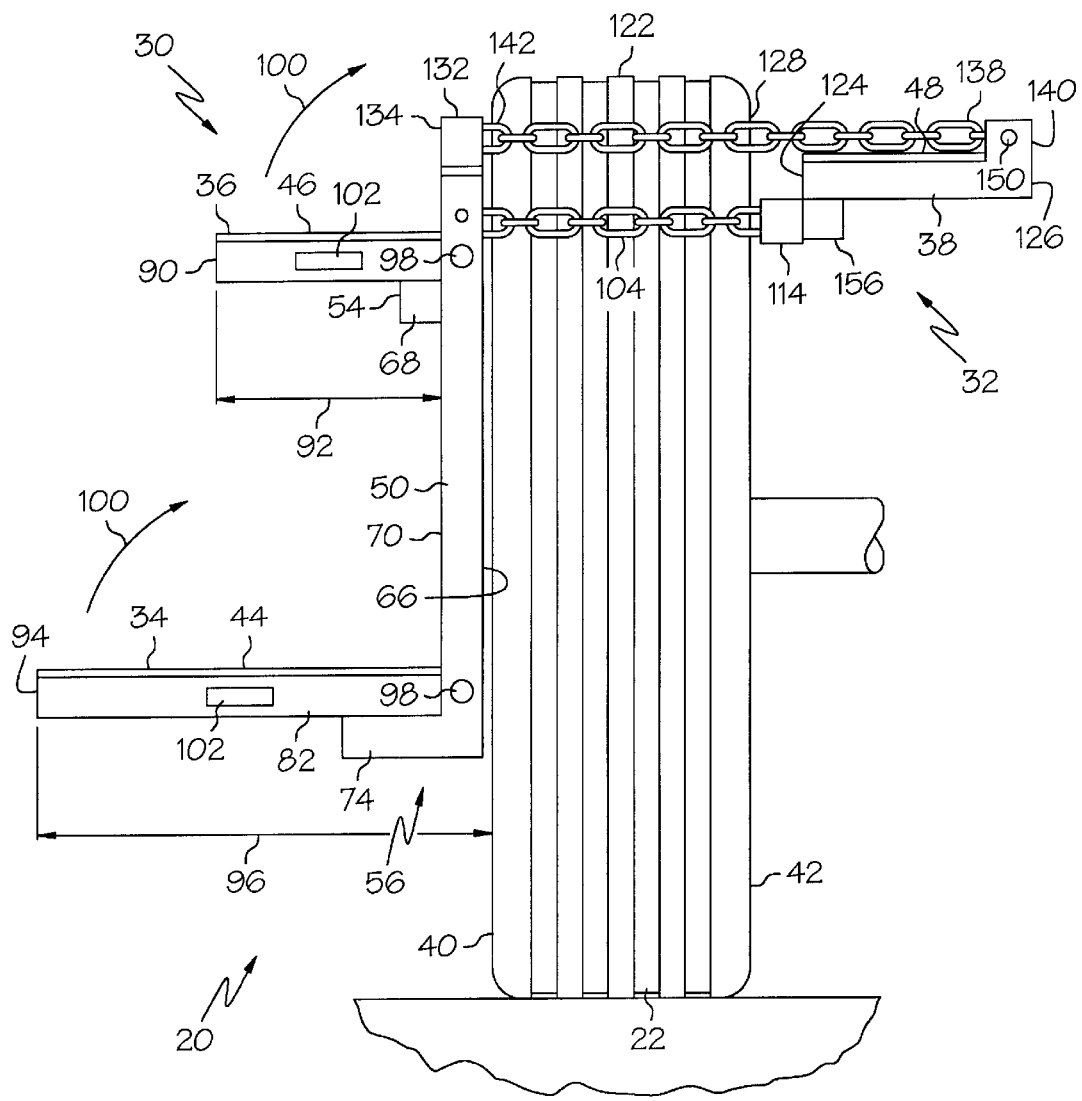
FIG. 3 shows a side view of the vehicular stepstool deployed on the tire.

With reference to FIGS. 2–3, FIG. 3 shows a side view of vehicular stepstool 20 deployed on tire 22. A first outer longitudinal edge 90 of outside upper platform 36 extends a first distance 92 from first and second upright supports 50 and 52, respectively, of the support frame. A second outer longitudinal edge 94 of outside lower platform 34 extends a second distance 96 from first and second upright supports 50 and 52. Due to the extension of outside lower platform 34 using first and second posts 82 and 86, respectively, second distance 96 is greater than first distance 92 so that first stepstool subassembly 30 advantageously forms a short staircase.

Each of outside lower platform 34 and outside upper platform 36 are attached to first and second upright supports 50 and 52, respectively, with pivoting fasteners 98 such that each of platforms 34 and 36 rotates about pivoting fasteners 90, as generally indicated by arrows 100. Thus, outside lower platform 34 and outside upper platform 36 can be adjusted between a deployed position (shown in FIG. 3) and a stowed position brought about when platforms 34 and 36 are pivoted in the direction of arrows 100.

Outside lower platform 34 rests on fourth support assembly 56 and outside upper platform 36 rests on third support 54 when stepstool 20 is deployed. As a result, fourth support assembly 56 and third support 54 desirably function to provide additional strength to support an individual's weight when standing or sitting on either of lower and upper platform surfaces 44 and 46, respectively. Each of outside lower platform 34 and outside upper platform 36 include a stop 102. Stops 102 are configured to abut first and second upright supports 50 and 52, respectively, when a corresponding one of platforms 34 and 36 is adjusted to the stowed position.

With continued reference to FIGS. 2–3, first stepstool subassembly 30 includes first linking members in the form of a first chain 104 and a second chain 106. First chain 104 has a first chain end 108 attached to first upper end 58 of first upright support 50, and a second chain end 110 for attachment to and extension from a first bar end 112 of a first retaining bar 114. Similarly, second chain 106 has a third chain end 116 attached to second upper end 60 of second upright support 52 and a fourth chain end 118 for attachment to and extension from a second bar end 120 of first retaining bar 114.

When first stepstool subassembly 30 of vehicular stepstool 20 is deployed on tire 22, tire contacting side 66 of first and second upright supports 50 and 52 rests against outer surface 40 of tire 22, first retaining bar 114 rests against inner surface 42 of tire 22, and first and second chains 104 and 106 are directed across an upper circumferential surface 122 of tire 22. The first linking members, i.e., first and second chains 104 and 106, are flaccid so that first and second chains 104 and 106 essentially conform to tire 22 and securely wrap about upper circumferential surface 122 of tire 22. The secure fit of first and second chains 104 and 106 prevents first stepstool subassembly 30 from sliding off of tire 22 when weight is applied to outside lower platform 34 and outside upper platform 36. In addition, the secure fit prevents first stepstool subassembly 30 from shifting as more weight is placed on one end of either of platforms 34 and 36 than the other end.

With continued reference to FIGS. 2–3 and with particular attention to second stepstool subassembly 32, inside platform 38 includes a first longitudinal edge 124 and a second longitudinal edge 126 outwardly spaced from first longitudinal edge 126. Second stepstool subassembly 32 further includes second linking members, in the form of a third chain 128 and a fourth chain 130, and a second retaining bar 132 having a third bar end 134 and a fourth bar end 136.

Third chain 128 has a first chain end 138 attached to a first end 140 of second longitudinal edge 126 and a second chain end 142 attached to third bar end 134 of second retaining bar 132. Similarly, fourth chain 130 has a third chain end 144 attached to a second end 146 of second longitudinal edge 126 and a fourth chain end 148 attached to fourth bar end 136. Fasteners 150 are used to couple each of first and third chain ends 138 and 144, respectively, to first and second ends 140 and 146, respectively, of second longitudinal edge 126. Each of third and fourth chains 128 and 130, respectively, are coupled to second longitudinal edge 126 of inside platform 38 so that they are directed toward first longitudinal edge 124 and inner surface 42 of tire 22 when stepstool 20 is mounted on tire 22.

Figure 4:
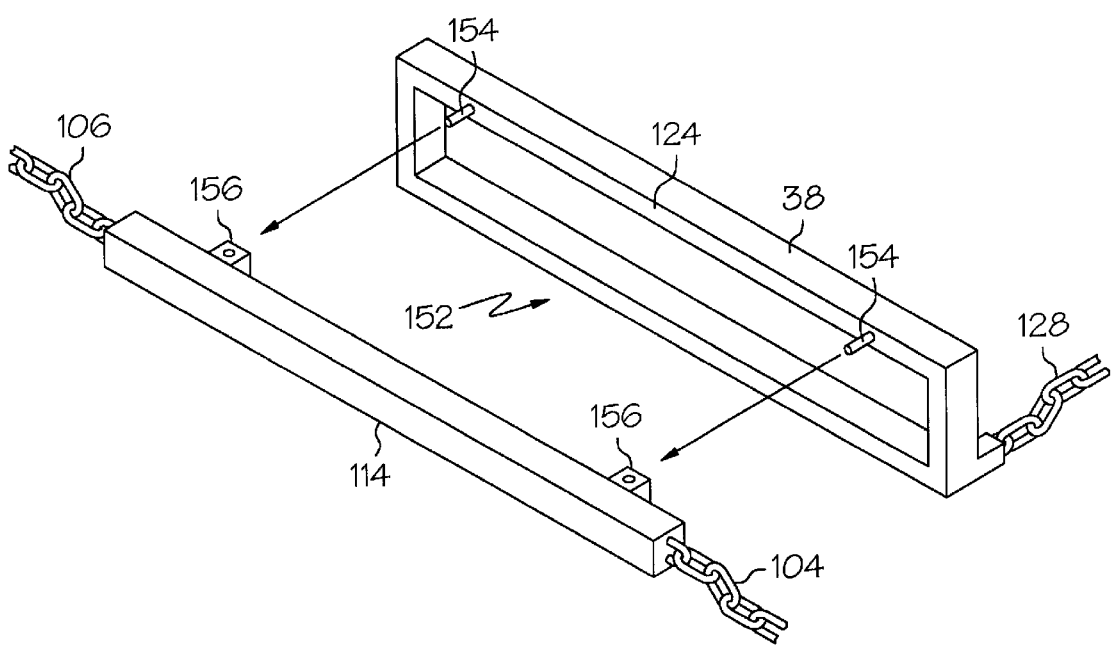
FIG. 4 shows a partial perspective view of a lower side of an inside platform of the stepstool.

Referring to FIG. 4 in connection with FIGS. 2–3, FIG. 4 shows a partial perspective view of a lower side 152 of inside platform 38 of stepstool 20. First longitudinal edge 124 of inside platform 38 is configured to releasably couple to first retaining bar 114. More specifically, inside platform 38 includes pegs 154 extending from lower side 152 of inside platform 38 along first longitudinal edge 124. Each of pegs 154 is configured for mating engagement with a socket element 156 of first retaining bar 114.

As shown in FIG. 4, two pegs 154 positioned along first longitudinal edge 124 are configured to seat into corresponding socket elements 156. Pegs 154 are utilized for ease of manufacture and as a quick connect and release feature. However, those skilled in the art will recognize that alternative fasteners may be used in lieu of the peg and socket element configuration utilized herein. In addition, more or less than two of pegs 154 or the alternative fasteners may be utilized.

When first stepstool subassembly 30 is deployed on tire 22, second stepstool subassembly 32 is deployed by mating pegs 154 with socket elements 156. Second retaining bar 132 is positioned to rest against outer surface 40 of tire 22, and the second linking members, i.e., third and fourth chains 128 and 130, respectively, are directed across upper circumferential surface 122 of tire 22. Like first and second chains 104 and 106, respectively, third and fourth chains 128 and 130 are flaccid so that third and fourth chains 128 and 130 essentially conform to tire 22 and securely wrap about upper circumferential surface 122 of tire 22 to retain second stepstool subassembly 32 securely to tire 22.

Accordingly, the mating engagement of pegs 154 with socket elements 156 of first retaining bar 114, combined with the retention of second retaining bar 132 against outer surface 40 of tire 22, secures second stepstool subassembly 32 to first stepstool subassembly 30 so that an individual may stand on inside platform 38 to readily access engine compartment 28 (FIG. 1) of vehicle 24 (FIG. 1).

The configuration of stepstool 20 is such that when an individual stands on either of outside lower and upper platforms 34 and 36, the force of first and second upright supports 50 and 52 against outer surface 40 of tire 22 translates to force from first retaining bar 114 against inner surface 42. Similarly, when an individual stands on inside platform 38, the force of pegs 154 in socket elements 156 of first retaining bar 114 translates to force from second retaining bar 132 against outer surface 40 of tire 22. These forces combine to form a stable and secure stepstool upon which an individual may stand or sit. Furthermore, since stepstool 20 merely rests on tire 22, it can be adjusted to provide the user relatively horizontal platforms upon which to stand, regardless of the incline of the surface upon which the vehicle is parked. In addition, stepstool 20 can be readily moved to different tires on the same vehicle, exposed when the tilt-forward hood is moved to an open position, or to a tire on a different vehicle.

In summary, the present invention teaches of a stepstool for mounting on a tire of a vehicle having a tilt-forward hood. The stepstool is configured such that it rests on and is supported by the tire. Since the stepstool does not sit on the ground, the stepstool is not subject to the incline and the inherent instability of the surface on which the tire is setting. The stepstool can be readily moved from one tire to the next and can be folded in a stowed configuration for storing in the vehicle. Moreover, the stepstool includes platforms configured to reside proximate the outer surface of the tire and a platform configured to reside proximate the inner surface of the tire so that an individual may readily step up and over the tire and readily access the engine compartment of a medium- or heavy-duty truck.

Although the preferred embodiments of the invention have been illustrated and described in detail, it will be readily apparent to those skilled in the art that various modifications may be made therein without departing from the spirit of the invention or from the scope of the appended claims. For example, the first stepstool subassembly need not have two platforms, but rather a single platform. Furthermore, the second stepstool subassembly having the inside platform need not be mated to the first stepstool subassembly in instances where the individual can readily access the engine compartment from ground level or from the first stepstool subassembly. In addition, the linking members and retaining bars may be adjustable in length to fit a wide variety of vehicle tires.

What is claimed is:

1. A vehicular stepstool for mounting on a tire of a vehicle, said tire having an outer surface and an inner surface, and said stepstool comprising:
    a first stepstool subassembly for residing proximate said outer surface of said tire, said first stepstool subassembly including:
        a support frame having first and second upper ends and having first and second lower ends;
        a first platform attached to said support frame proximate said first and second upper ends;
        a second platform attached to said support frame proximate said first and second lower ends;
        a first retaining bar having first and second bar ends; and
        first linking members attached to and extending from said first and second bar ends and attached to said first and second upper ends of said support frame; and
    a second stepstool subassembly optionally connectable to said first stepstool subassembly for residing proximate said inner surface of said tire, said second stepstool subassembly including:
        a third platform having a peg extending from a lower side of a longitudinal edge of said third platform for mating engagement with a socket element of said first retaining bar;
        a second retaining bar having third and fourth bar ends; and
        second linking members attached to and extending from said third and fourth bar ends and attached to said third platform.

2. A vehicular stepstool for mounting on a tire of a vehicle comprising:
    a support frame having first and second upper ends;
    a first platform attached to said support frame;
    a first retaining bar having first and second bar ends;
    first linking members attached to and extending from said first and second bar ends and attached to said first and second upper ends of said support frame;
    a second platform releasably coupled to said first retaining bar;
    a second retaining bar having third and fourth bar ends; and
    second linking members attached to and extending from said third and fourth bar ends and attached to said second platform.

3. A vehicular stepstool as claimed in claim 2 further comprising a third platform attached to said support frame.

4. A vehicular stepstool as claimed in claim 3 wherein:
    said first platform includes a first platform surface having a first outer longitudinal edge extending a first distance from said support frame; and
    said third platform includes a second platform surface having a second outer longitudinal edge extending a second distance from said support frame, said second distance being greater than said first distance.

5. A vehicular stepstool as claimed in claim 4 wherein:
    said support frame includes a first upright support having said first upper end and having a first lower end and a second upright support having said second upper end and having a second lower end; and said third platform further includes a first post extending from a first side of said second platform surface, said first post being coupled to said first lower end of said first upright support, and a second post extending from a second side of said second platform surface, said second post being coupled to said second lower end of said second upright support.

6. A vehicular stepstool as claimed in claim 3 wherein:

said first platform is attached to said support frame proximate said first and second upper ends; and said support frame further includes first and second lower ends, said third platform being attached to said support frame proximate said first and second lower ends.

7. A vehicular stepstool as claimed in claim 3 wherein said support frame comprises:

a first upright support having said first upper end and having a first lower end;

a second upright support having said second upper end and having a second lower end, said first and second upright supports having a tire contacting side;

a third support having a first end coupled to said first upper end of said first upright support and a second end coupled to said second upper end of said second upright support, said first and second ends of said third support being attached to said first and second upright supports on a side opposite from said tire contacting side, said first platform resting on said third support; and a fourth support assembly including a first extension post coupled to and extending from said first lower end of said first upright support, a second extension post coupled to and extending from said second lower end of said second upright support, and a fourth support coupled to distal ends of each of said first and second extension posts, said third platform resting on said fourth support.

8. A vehicular stepstool as claimed in claim 3 further comprising fasteners for pivotally attaching each of said first and third platforms to said support frame to adjust said first and third platforms to one of a deployed position and a stowed position.

9. A vehicular stepstool as claimed in claim 8 wherein each of said first and third platforms includes a stop, said stop abutting said support frame when a corresponding one of said first and third platforms is adjusted to said stowed position.

10. A vehicular stepstool as claimed in claim 2 wherein said second platform comprises a peg extending from a lower side of a longitudinal edge of said second platform, said peg being matingly engaged with a socket element of said first retaining bar.

11. A vehicular stepstool as claimed in claim 10 wherein said second platform further comprises a second peg extending from said lower side of said longitudinal edge of said second platform, said second peg being matingly engaged with a second socket element of said first retaining bar.

12. A vehicular stepstool as claimed in claim 2 wherein:

said second platform comprises a first longitudinal edge releasably coupled to said first retaining bar, and a second longitudinal edge outwardly spaced from said first longitudinal edge; and said vehicular stepstool further comprises a first fastener for coupling a first one of said second linking members to a first end of said second longitudinal edge, and a second fasten for coupling a second one of said second linking members to a second end of said second longitudinal edge.

13. A vehicular stepstool as claimed in claim 12 wherein said second linking members comprise:

a first chain having first and second chain ends, said first chain end being attached to said first end of said second longitudinal edge and said first chain being directed toward said first longitudinal edge, and said second chain end being attached to said third bar end of said second retaining bar; and a second chain having third and fourth chain ends, said third chain end being attached to said second end of said second longitudinal edge said second chain being directed toward said first longitudinal edge, and said fourth chain end being attached to said fourth bar end of said second retaining bar.

14. A vehicular stepstool as claimed in claim 2 wherein said first and second linking members are flaccid.

15. A vehicular stepstool for mounting on a tire of a vehicle, said vehicular stepstool comprising:

a support frame having first and second upper ends;

a first platform attached to said support frame;

a first retaining bar having first and second bar ends;

first linking members attached to and extending from said first and second bar ends and attached to said first and second upper ends of said support frame;

a second platform having a peg extending from a lower side of a longitudinal edge of said second platform, said peg being releasably coupled to a socket element of said first retaining bar;

a second retaining bar having third and fourth bar ends; and second linking members attached to and extending from said third and fourth bar ends and attached to said second platform.

16. A vehicular stepstool as claimed in claim 15 wherein:

said second platform further comprises a second longitudinal edge outwardly spaced from said longitudinal edge of said second platform; and said vehicular stepstool further comprises fasteners for coupling a first one of said second linking members to a first end of said second longitudinal edge, and for coupling a second one of said second linking members to a second end of said second longitudinal edge.

17. A vehicular stepstool as claimed in claim 15 wherein said first and second linking members are flaccid.

18. A vehicular stepstool for mounting on a tire of a vehicle comprising:

a support frame having first and second upper ends and having first and second lower ends;

a first platform attached to said support frame proximate said first and second upper ends;

a second platform attached to said support frame proximate said first and second lower ends;

a first retaining bar having first and second bar ends;

first linking members attached to and extending from said first and second bar ends and attached to said first and second upper ends of said support frame;

a third platform releasably coupled to said first retaining bar, said third platform including a peg extending from a lower side of a longitudinal edge of said third platform, said peg being matingly engaged with a socket element of said first retaining bar;

a second retaining bar having third and fourth bar ends; and second linking members attached to and extending from said third and fourth bar ends and attached to said third platform.

19. A vehicular stepstool as claimed in claim 18 wherein:

said first platform includes a first platform surface having a first outer longitudinal edge extending a first distance from said support frame; and said third platform includes a second platform surface having a second outer longitudinal edge extending a second distance from said support frame, said second distance being greater than said first distance.

20. A vehicular stepstool as claimed in claim 18 further comprising fasteners for pivotally attaching each of said first and second platforms to said support frame to adjust said first and second platforms to one of a deployed position and a stowed position.

* * * * *